(12) United States Patent
Park

(10) Patent No.: US 10,071,696 B2
(45) Date of Patent: Sep. 11, 2018

(54) CAMERA MODULE FOR AUTOMOBILE

(71) Applicant: LG Innotek Co., Ltd., Seoul (KR)

(72) Inventor: Seung Ryong Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/526,940

(22) PCT Filed: Nov. 11, 2015

(86) PCT No.: PCT/KR2015/012091
§ 371 (c)(1),
(2) Date: May 15, 2017

(87) PCT Pub. No.: WO2016/076619
PCT Pub. Date: May 19, 2016

(65) Prior Publication Data
US 2017/0320449 A1 Nov. 9, 2017

(30) Foreign Application Priority Data
Nov. 14, 2014 (KR) .................. 10-2014-0158684

(51) Int. Cl.
| | |
|---|---|
| *H04N 5/225* | (2006.01) |
| *B60R 11/04* | (2006.01) |
| *H04N 5/232* | (2006.01) |
| *B60R 1/00* | (2006.01) |

(52) U.S. Cl.
CPC ........... *B60R 11/04* (2013.01); *H04N 5/2252* (2013.01); *H04N 5/2253* (2013.01); *H04N 5/2254* (2013.01); *H04N 5/2257* (2013.01); *H04N 5/232* (2013.01); *B60R 1/00* (2013.01); *B60R 2300/80* (2013.01)

(58) Field of Classification Search
CPC .................................................... H04N 5/2252
USPC ........................................................ 348/375
See application file for complete search history.

(56) References Cited

U.S. PATENT DOCUMENTS

| | | | | |
|---|---|---|---|---|
| 2003/0112608 | A1* | 6/2003 | Takami | H05K 1/144 361/736 |
| 2003/0234403 | A1* | 12/2003 | Mou | H05K 3/3442 257/100 |
| 2010/0015857 | A1* | 1/2010 | Feng | A61B 1/051 439/676 |

FOREIGN PATENT DOCUMENTS

| | | |
|---|---|---|
| JP | 2002359448 A | 12/2002 |
| JP | 2010177822 A | 8/2010 |
| KR | 20060091906 A | 8/2006 |

(Continued)

OTHER PUBLICATIONS

International Search Report in International Application No. PCT/KR2015/012091, filed Nov. 11, 2015.

*Primary Examiner* — Joel Fosselman
(74) *Attorney, Agent, or Firm* — Saliwanchik, Lloyd & Eisenschenk

(57) ABSTRACT

An embodiment of a camera module comprises: a lens part; a housing for coupling the lens part; a plurality of substrates which are disposed at an interval from each other inside the housing; and an electromagnetic field shielding part, disposed inside the housing, for preventing the occurrence of external leakage of electromagnetic field from each of the substrates, wherein the electromagnetic field shielding part may comprise a coupling means for coupling the plurality of substrates at an interval from each other in the optical axial direction of the lens part.

18 Claims, 8 Drawing Sheets

(56) References Cited

FOREIGN PATENT DOCUMENTS

| KR | 20080040236 A | 5/2008 |
| KR | 20080074546 A | 8/2008 |

* cited by examiner

CAMERA MODULE FOR AUTOMOBILE

CROSS-REFERENCE TO RELATED APPLICATIONS

This application is the U.S. national stage application of International Patent Application No. PCT/KR2015/012091, filed Nov. 11, 2015, which claims priority to Korean Application No. 10-2014-0158684, filed Nov. 14, 2014, the disclosures of each of which are incorporated herein by reference in their entirety.

TECHNICAL FIELD

Embodiments relate to a sturdy camera module for an automobile, which is capable of preventing the occurrence of, for example, positional deviation and damage due to external shocks and vibrations.

BACKGROUND ART

In this section, the following description merely provides information regarding the background of embodiments, and does not constitute the conventional art.

A camera module may be mounted in an automobile for various purposes. For example, an automobile may be provided at the rear part thereof with a camera module for securing a visual field at the rear of the automobile when the automobile is being parked.

In addition, a camera module may also be used in a black box for automobiles, which is very useful in retracing the details of a traffic accident, including the cause of the accident. Furthermore, a camera module has been increasingly used as a recognition device for clearly and easily recognizing the situation in a blind spot, which a driver or a passenger in an automobile cannot easily check with the naked eye.

In recent years, smart cars, i.e. automobiles each equipped with a collision warning system for warning of the possibility of a collision in front of the automobile or to the rear of the automobile while the automobile is being driven or a collision avoidance system for directly avoiding a collision between the automobile and other automobiles running alongside the automobile under the control of a controller mounted in the automobile, rather than based on the driving of a driver, have been increasingly manufactured, and related technologies have been increasingly developed.

A camera module has been increasingly used as a means for recognizing the situation outside such a smart car, and as a result, camera modules for automobiles have been increasingly developed and manufactured.

The camera module for automobiles may include a plurality of printed circuit boards (PCBs), which may be spaced apart from each other by a predetermined distance. Since the camera module including the printed circuit boards is mounted in a traveling automobile, the camera module is inevitably subjected to many shocks and vibrations due to external force, compared to camera modules that are used for other purposes.

In particular, printed circuit boards have a high risk of moving from the original positions thereof due to the continuous application of external shocks and vibrations and, in addition, there is a high risk of damage to connectors that electrically connect the printed circuit boards to one another.

Therefore, there is a demand for a sturdy connection structure for circuit boards that is capable of preventing the occurrence of, for example, positional deviation and damage to the printed circuit boards and the connectors for the same due to external shocks and vibrations.

DISCLOSURE

Technical Problem

Accordingly, embodiments provide a sturdy camera module for an automobile, which is capable of preventing the occurrence of, for example, positional deviation and damage due to external shocks and vibrations.

It should be noted that the objects of the disclosure are not limited to the objects mentioned above, and other unmentioned objects of the disclosure will be clearly understood by those skilled in the art to which the disclosure pertains from the following description.

Technical Solution

In one embodiment, a camera module includes a lens unit, a housing coupled with the lens unit, a plurality of boards located inside the housing while being spaced apart from each other, and an electromagnetic-field shield located inside the housing in order to prevent the outward leakage of an electromagnetic field formed in each of the boards, the electromagnetic-field shield being provided with a coupling member to enable the boards to be coupled to the electromagnetic-field shield while being spaced apart from each other in the optical axis direction of the lens unit.

In another embodiment, a camera module includes a housing, a plurality of boards located inside the housing while being spaced apart from each other, an electromagnetic-field shield located inside the housing, coupling bosses located inside the electromagnetic-field shield in order to enable the boards to be coupled to the electromagnetic-field shield while being spaced apart from each other, and a plurality of connectors for electrically connecting the boards to one another.

In a further embodiment, a camera module includes a housing, a plurality of boards located inside the housing while being spaced apart from each other by a constant distance, an electromagnetic-field shield located inside the housing, coupling bosses located inside the electromagnetic-field shield in order to enable the boards to be coupled to the electromagnetic-field shield while being spaced apart from each other by a constant distance, and a plurality of connectors for electrically connecting the boards to one another, wherein the electromagnetic-field shield is provided at one end thereof with bent portions and the bent portions are coupled to the housing by means of fasteners.

Advantageous Effects

According to the embodiments, coupling bosses having a simple structure are formed at an electromagnetic-field shield, which has the effect of enabling boards to be securely coupled to the interior of a camera module while being spaced apart from each other by a given distance.

In addition, owing to the firm coupling structure of the respective boards, the respective boards maintain a constant distance therebetween, rather than deviating from given positions, even if external shocks or vibrations are continuously applied thereto, which has the effect of preventing damage to the boards and the malfunction of the camera module.

In addition, it is possible to variously set the distance between the respective coupling bosses in an optical axis direction, which has the effect of enabling easy adjustment of the distance between the respective boards.

In addition, through the easy adjustment of the distance between the respective boards, it is possible to provide connectors 60 for electrical connection between the respective boards with an assembly tolerance to prevent the connectors from being tightly coupled to the respective boards, which has the effect of preventing damage to the connectors and short-circuit due to shocks or vibrations.

BEST MODE

Figure 1:
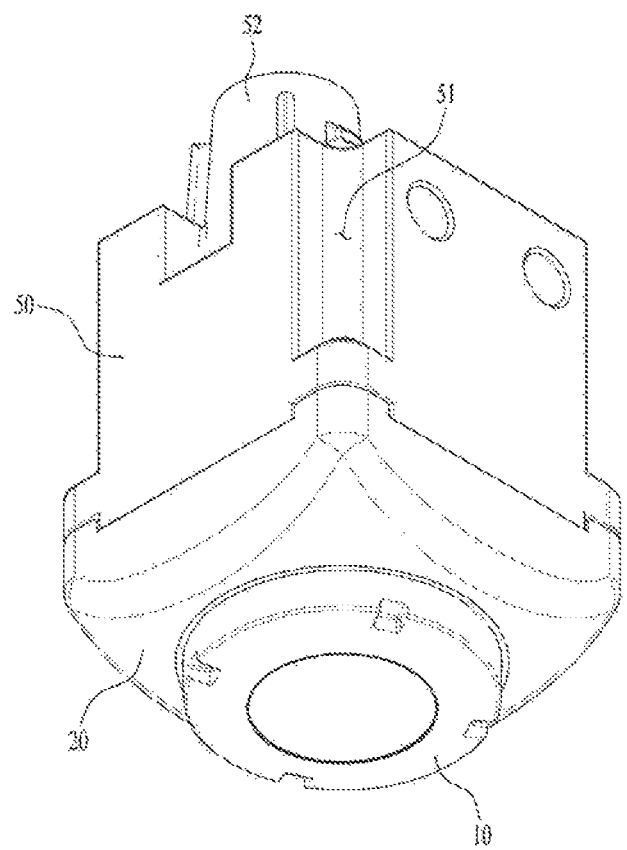
FIG. 1 is a perspective view illustrating a camera module according to one embodiment.

Hereinafter, embodiments will be described in detail with reference to the accompanying drawings. While the disclosure is susceptible to various modifications and alternative forms, specific embodiments thereof are shown by way of example in the drawings and are explained in detail in the description. However, the disclosure should not be construed as limited to the embodiments set forth herein, but on the contrary, the disclosure is intended to cover all modifications, equivalents, and alternatives falling within the spirit and scope of the embodiments. In the drawings, the sizes and shapes of elements may be exaggerated for convenience and clarity of description.

It may be understood that, although the terms "first," "second," etc. may be used herein to describe various elements, these elements should not be limited by these terms. These terms are generally only used to distinguish one element from another. In addition, terms particularly defined in consideration of construction and operation of the embodiments are used only to describe the embodiments, but do not define the scope of the embodiments.

It will be understood that when an element is referred to as being "on" or "under" another element, it can be directly on/under the element, or one or more intervening elements may also be present. When an element is referred to as being "on" or "under," "under the element" as well as "on the element" can be included based on the element.

In addition, relational terms, such as "on/upper part/above" and "under/lower part/below," are used only to distinguish between one subject or element and another subject or element without necessarily requiring or involving any physical or logical relationship or sequence between such subjects or elements.

Figure 2:
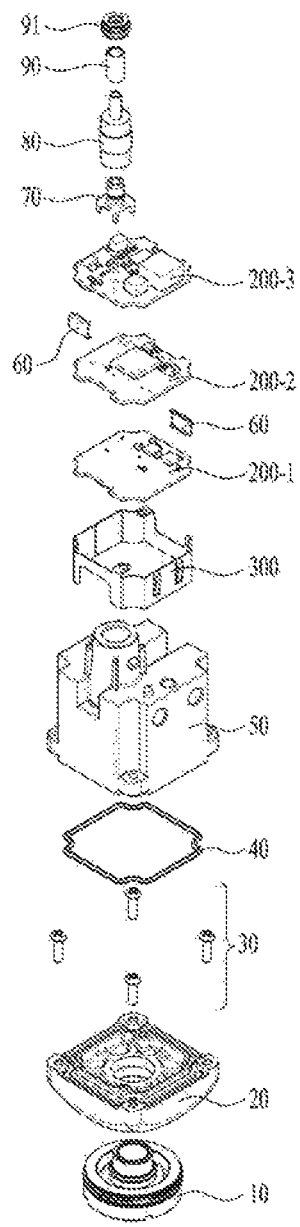
FIG. 2 is an exploded perspective view illustrating the camera module according to the embodiment.
Figure 3:
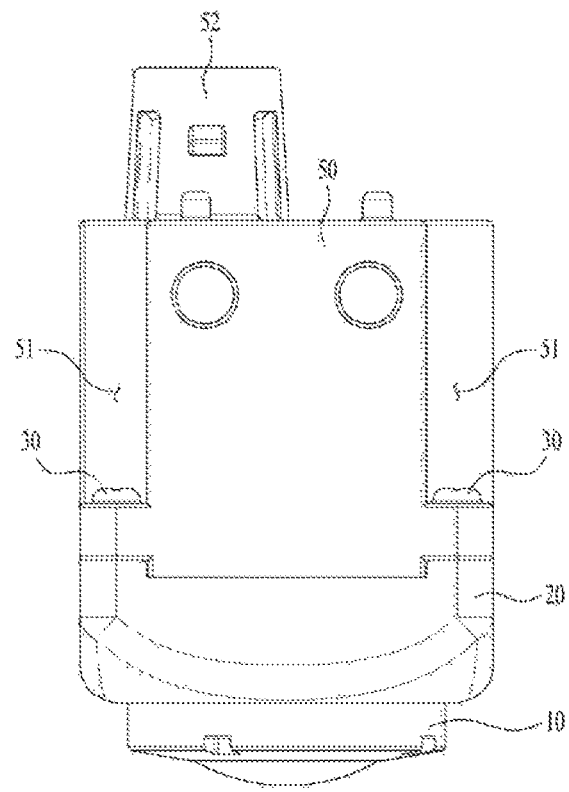
FIG. 3 is a side view illustrating the camera module according to the embodiment.

FIG. 1 is a perspective view illustrating a camera module according to one embodiment. FIG. 2 is an exploded perspective view illustrating the camera module according to the embodiment. FIG. 3 is a side view illustrating the camera module according to the embodiment.

The camera module may include a lens unit 10, a front cover 20, fasteners 30, a first sealing member 40, a first sealing member 40, and a housing 50.

The lens unit 10 serves to capture an image of an external object, and, although not illustrated, the lens unit 10 may include, for example, a lens barrel, a lens-moving device to move the lens barrel in a first direction for focusing, and a shaking correction device to control the movement of the lens barrel in a direction perpendicular to the first direction. At this time, the lens barrel may be a single lens, or may include a plurality of lenses arranged in the first direction.

In addition, as the lens unit 10 is coupled to the front cover 20 via, for example, shape-fitting or interference-fitting, a sealing device may be provided to prevent moisture, dust and other impurities from entering the camera module through a gap in a coupling region of the lens unit 10 and the front cover 20.

The lens unit 10 is mounted to a front portion of the front cover 20. To this end, the front portion of the front cover 20 may have a hollow region in which the lens unit 10 is mounted. The housing 50 may be coupled to a rear portion of the front cover 20. For example, coupling of the front cover 20 and the housing 50 may be implemented by the fasteners 30, as illustrated in FIG. 2.

The fasteners 30 may serve to couple the front cover 20 and the housing 50 to each other. For coupling of the fasteners 30, for example, as illustrated in FIG. 3, the housing 50 may have holes therein and the front cover 20 may have recesses in regions thereof corresponding to the holes in the housing 50.

In the embodiment, since the housing 50 is formed with the holes, the housing 50 may also be formed with first avoidance recesses 51 for the fasteners 30, which serve to assist the fasteners 30 in being easily coupled to the front cover 20 and the housing 50. However, the first avoidance recesses 51 may be omitted when the coupling structure between the housing 50 and the front cover 20 using the fasteners 30 is changed, or when the housing 50 and the front cover 20 are coupled to each other without using the fasteners 30.

For example, when the fasteners 30 are coupled in a direction opposite to that in the above-described embodiment, i.e. when the front cover 20 is formed with holes and the housing 50 is formed with recesses such that the fasteners 30 are coupled from the holes in the front cover 20 to the recesses in the housing 50, the first avoidance recesses 51 may be omitted.

In another embodiment, when the front cover 20 and the housing 50 are coupled to each other via shape-fitting or interference-fitting without using the fasteners 30, the fasteners 30 are unnecessary and, therefore, the first avoidance recesses 51 may be omitted.

The first sealing member 40 may be located at a coupling region of the front cover 20 and the housing 50 and may serve to prevent moisture, dust and other impurities from entering the camera module through a gap in the coupling region of the front cover 20 and the housing 50.

For example, the first sealing member 40, as illustrated in FIG. 2, may be a gasket, an O-ring, or any one of other appropriate members, which have an appropriate size and shape to be located in a region in which it can effectively block a gap in the coupling region of the front cover 20 and the housing 50.

The housing 50 is coupled to the front cover 20 and is configured to accommodate most constituent components of the camera module so as to hermetically seal the constituent components from the outside, thereby preventing damage to and malfunction of the constituent components of the camera module accommodated therein due to external shocks and preventing external moisture, dust, and other impurities from entering the camera module.

As described above, the housing 50 may be formed with the first avoidance recesses 51 for the fasteners 30 to assist the fasteners 30 in being easily coupled to the front cover 20 and the housing 50. However, as described above, when the coupling structure of the front cover 20 and the housing 50 is changed or when the front cover 20 and the housing 50 are coupled to each other via shape-fitting or interference-fitting without using the fasteners 30, the first avoidance recesses 51 may be omitted.

A protrusion 52 may be formed at the back of the housing 50 in order to hermetically seal an external cable electrically connected to the camera module and a region for installation of the external cable. The protrusion 52 may be configured to accommodate a terminal 70, a cable (not illustrated) having one end electrically connected to the terminal 70, a cable penetration member 80, a bushing 90, and a second sealing member 91. Hereinafter, the aforementioned constituent components will be described in detail.

The camera module may include connectors 60, the terminal 70, the cable penetration member 80, the bushing 90, and the second sealing member 91.

The connectors 60 may serve to implement electrical connection between a first board 200-1 and a second board 200-2 and electrical connection between the second board 200-2 and a third board 200-3, which will be described later. A detailed configuration of the connectors 60 will be described later.

The terminal 70 may be located to be coupled to the third board 200-3, which will be described below, and serve to implement electrical connection with the outside of the camera module. Electric power is supplied from the cable connected to the terminal 70 to the third board 200-3 provided inside the camera module and, in turn, supplied to the second board 200-2 and the first board 200-1, which are electrically connected to the third board 200-3 via the connectors 60.

In addition, as the first board 200-1 is electrically connected to the lens unit 10, the lens-moving device and the shaking correction device included in the lens unit 10 as described above may be operated by the electric power supplied through the first board 200-1.

The cable penetration member 80 may take the form of a hollow member, such that a portion of the terminal 70 may be received in a hollow region and the cable connected to the terminal 70 may extend through the hollow region.

Meanwhile, the terminal 70 and the cable may be firmly coupled to prevent short-circuit therebetween via, for example, soldering or bonding using an electrically conductive adhesive.

Coupling of the bushing 90 and the cable penetration member 80 may be implemented in such a manner that one side of the bushing 90 is fitted to the inner circumferential surface of the cable penetrating member 80 or one side of the cable penetrating member 80 is fitted to the inner circumferential surface of the bushing 90, and the bushing 90 may serve to extend the cable penetration member 80.

Accordingly, the bushing 90 may have a hollow region in communication with the cable penetration member 80 and the cable may penetrate through the hollow region. Meanwhile, the bushing 90 may be omitted when the cable penetration member 80 is sufficiently long. Whether to additionally provide the bushing 90 or to use only the cable penetration member 80 may be appropriately selected in consideration of, for example, the size and shape of the camera module and the arrangement of constituent components.

The second sealing member 91 may be located in a gap between an end of the bushing 90 or the cable penetration member 80 and the protrusion 52 of the housing 50 and may serve to prevent moisture, dust, and other impurities from entering the camera module through the gap.

Accordingly, the second sealing member 91 may have an approximately cylindrical shape and may be fitted to come into close contact at the inner circumferential surface thereof with the outer circumferential surface of the bushing 90 or the cable penetration member 80 and to come into close contact at the outer circumferential surface thereof with the inner circumferential surface of the hollow region formed in the protrusion 52.

Figure 4A:
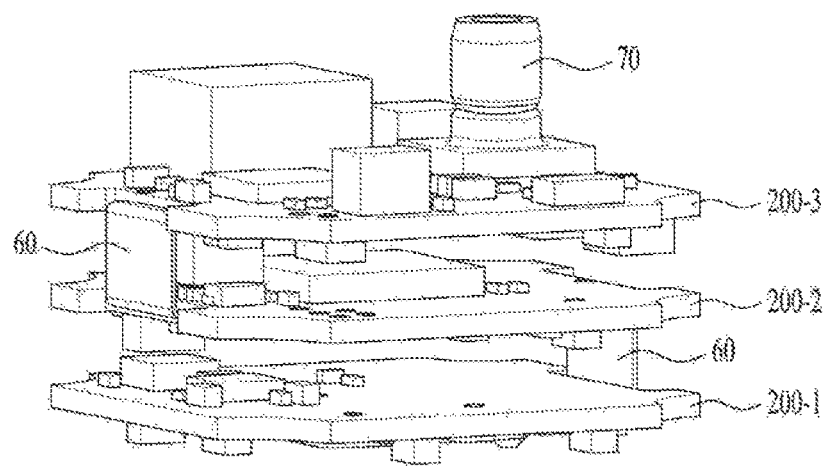
FIG. 4a is a perspective view illustrating part of the interior configuration of the camera module according to the embodiment.
Figure 4B:
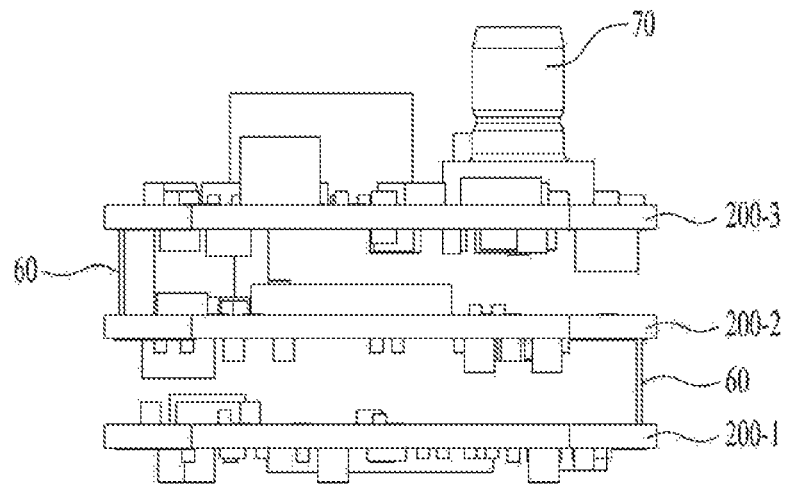
FIG. 4b is a side view illustrating part of the interior configuration of the camera module according to the embodiment.

FIG. 4a is a perspective view illustrating part of the interior configuration of the camera module according to the embodiment. FIG. 4b is a side view illustrating part of the interior configuration of the camera module according to the embodiment.

The first board 200-1 may be located close to the lens unit 10 and may be formed with an electromagnetic circuit including an image sensor 600 (refer to FIG. 5), and as the image-sensing unit captures an image of an object transmitted through the lens unit 10, the first board 200-1 may serve to convert the sensed image into electrical signals and to transmit the same to an external image storage device and/or image reproduction device. However, the conversion of the sensed image into the electrical signals may also be performed at the second board 200-2.

Meanwhile, the first board 200-1 may be formed with an electromagnetic circuit to control the lens unit 10. That is, the first board 200-1 may receive electric power from an external power source through the cable, the third board 200-3, and the second board 200-2 to control the lens-moving device and the shaking correction device of the lens unit 10.

The third board 200-3 may be spaced apart from the first board 200-1 by a given distance, may include the terminal 70 for electrical connection with the outside, and may be formed with an electromagnetic circuit. The second board 200-2 may be located between the first board 200-1 and the third board 200-3, may be electrically connected to the first board 200-1 and the third board 200-3, and may be formed with an electromagnetic circuit.

The second board 200-2 and the third board 200-3 may serve to supply electric power required for the first board 200-1 and to transmit electrical signals related to the sensed image transmitted from the first board 200-1 to the external image storage device and/or image reproduction device.

For example, the second board 200-2 may serve to convert the sensed image transmitted from the first board 200-1 into electrical signals so as to transmit the same to the external image storage device and/or image reproduction device, or may serve to rectify the electric power input from the third board 200-3 so as to transmit the same to the first board 200-1. That is, the second board 200-2, located at a middle position between the first board 200-1 and the third board 200-3, may partially share the roles of the first board 200-1 and the third board 200-3.

The third board 200-3 may mainly serve to supply electric power required for operation of the lens unit 10 and may also serve to transmit the electrical signals related to the sensed image transmitted from the first board 200-1 and the second board 200-2 to the external image storage device and/or image reproduction device.

Accordingly, several elements, such as, for example, a condenser, a rectifier, and a transformer to supply electric power having an appropriate voltage and current required for operation of the lens unit 10, may be mounted to the third board 200-3. In addition, the terminal 70, to which the end of the cable is coupled as described above, may be mounted to the third board 200-3 for electrical connection with, for example, the external image storage device, image reproduction device, or camera module control device.

As described above, since elements occupying a given volume such as, for example, the condenser, the rectifier, the transformer, and the terminal 70, may be mounted or coupled to the first board 200-1, the second board 200-2, and the third board 200-3, there is required a device to ensure a constant distance between the respective boards and to maintain the constant distance between the boards even when shocks and vibrations are applied to the camera module by external force. This may be realized by an electromagnetic-field shield 300, at which a coupling boss 500 is formed, which will be described later with reference to FIG. 5.

Meanwhile, the respective boards may be printed circuit boards (PCBs) and may be manufactured into a form that allows the installation of the elements required on the respective printed circuit boards. In addition, the respective boards may be formed of a strong material in order to maintain a constant distance therebetween even when shocks and vibrations are applied to the camera module by external force.

The connectors 60 may serve to electrically connect the respective boards to one another. For example, as illustrated in FIG. 4a, the camera module may include the connector 60 to electrically connect the first board 200-1 and the second board 200-2 to each other and the connector 60 to electrically connect the second board 200-2 and the third board 200-3 to each other.

Although the embodiment illustrates that the connectors 60 for interconnection of the respective boards are individually provided at lateral sides of the respective boards, the disclosure is not limited thereto, and the number and arrangement positions of the connectors 60 may be selected in consideration of the circuit structure of the respective boards and the overall structure of the camera module.

The connectors 60 may be formed of a flexible material that ensures easy coupling between the respective boards and is capable of absorbing shocks and vibrations to prevent the camera module from being damaged by shocks and vibrations applied from outside the camera module. As such, the connectors 60 may be configured as flexible circuit boards.

However, the disclosure is not limited to the above description, and the connectors 60 may be formed using any other strong materials so long as they are resistant to shocks and vibrations, or may be formed using a bundle of electric wires. In addition, for example, soldering, adhesion using an electrically conductive adhesive, shape-fitting, or interference-fitting may be used for coupling between the connectors 60 and the boards. These connectors 60 may serve as B2B (board-to-board) connectors 60 that electrically connect the respective boards to one another.

Figure 5:
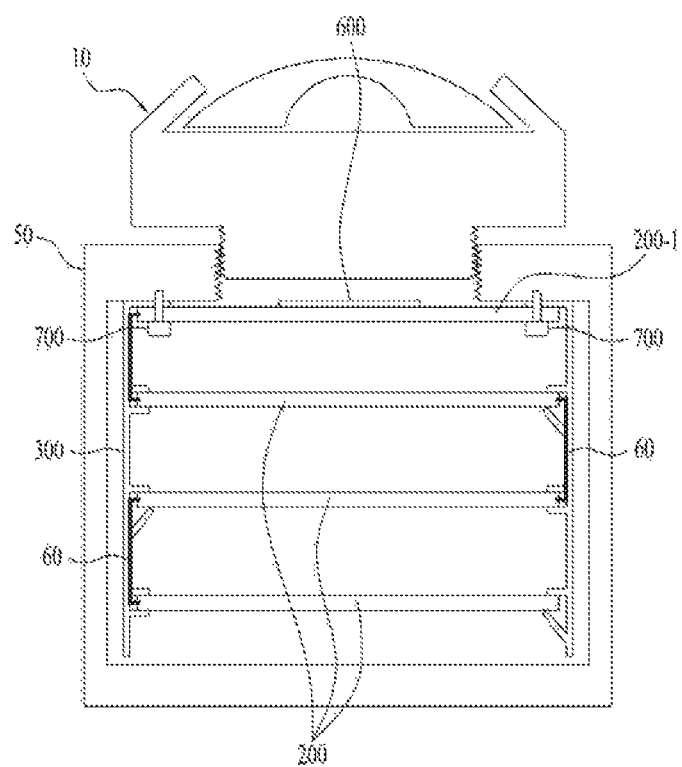
FIG. 5 is a side-sectional view illustrating the interior configuration of the camera module according to the embodiment.
Figure 6:
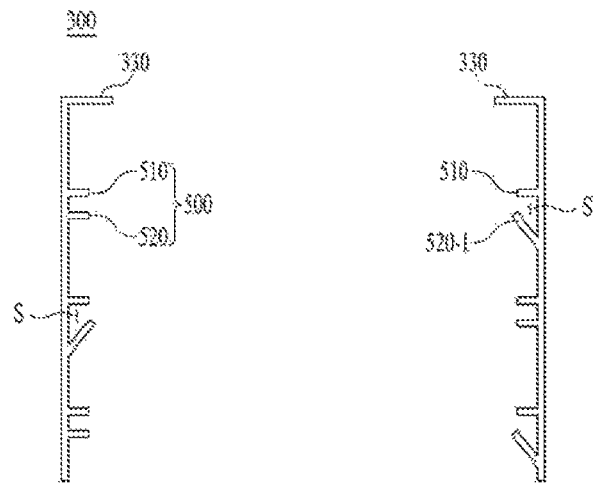
FIG. 6 is a side-sectional view illustrating an electromagnetic-field shield according to the embodiment.

FIG. 5 is a side-sectional view illustrating the interior configuration of the camera module according to the embodiment. FIG. 6 is a side-sectional view illustrating an electromagnetic-field shield 300 according to the embodiment.

The camera module of the embodiment may include boards 200 and an electromagnetic-field shield 300. The boards 200 may perform a function similar to that of the above-stated boards 200. Although the camera module including three boards 200 has been described as one embodiment with reference to FIGS. 2, 4a and 4b, the number of boards 200 may be 1, 2, 4 or more in accordance with, for example, the performance, size and configuration of the camera module.

Hereinafter, the configuration of the camera module including four boards 200 will be exemplarily described for clarity of description. At this time, the configuration described below may be identically applied to the case in which the number of boards 200 is 2 or 3. Further, the illustration of the condenser, the rectifier and various other elements, which are coupled to the respective boards 200, will be omitted for clarity of description.

In addition, the boards 200 may respectively perform their own functions, as described in the above-stated embodiment. Note that the image sensor 600, which captures an image of an object transmitted from the lens, is provided at the first board 200-1 of the boards 200, which is located adjacent to the lens unit 10.

Meanwhile, the boards 200 may be electrically connected to a ground wire. At this time, the ground wire may be one of a plurality of cables coupled to the terminal 70. As the ground wire is connected to at least one of the boards 200, it is possible to prevent short-circuit and damage to the respective boards 200 due to a sudden surging voltage that may occur in the respective boards 200.

The electromagnetic-field shield 300 may be located inside the housing 50 and may serve to prevent the outward leakage of an electromagnetic field formed in each of the boards 200. Meanwhile, the electromagnetic-field shield 300 may be provided with a coupling member, by which the boards 200 are coupled to the electromagnetic-field shield 300 while being spaced apart from each other by a given distance in the optical axis direction of the lens unit 10.

The coupling member may be, for example, a coupling boss 500, which has one end protruding from the inner surface of the electromagnetic-field shield 300. Specifically, the coupling boss 500, as illustrated in FIG. 6, may include a first support portion 510, which is formed at a region that is relatively close to the lens unit 10, and a second support portion 520, which is formed at a region that is relatively far from the lens unit 10 as compared to the first support portion 510 so that the first support portion 510 and the second support portion 520 may be spaced apart from each other. At this time, an insertion space s, into which a lateral side of each of the boards 200 is inserted, may be formed in a region between the first support portion and the second support portion.

Further, a pair of coupling bosses 500 may be formed on the inner surface of the electromagnetic-field shield 300 so as to face each other. The number of pairs of coupling bosses 500 may be equal to or greater than the number of boards 200.

That is, when the number of pairs of coupling bosses 500 is greater than the number of boards 200 that are accommodated in the camera module, it is possible to accommodate all of the boards 200 required in the camera module. Further, the pairs of coupling bosses 500 may be spaced apart from each other in the optical axis direction of the lens unit 10 by a given distance corresponding to the distance between the respective boards 200.

Meanwhile, the first support portion 510 may protrude in a direction perpendicular to the optical axis direction of the lens unit 10. Further, at least a portion of the second support portion 520 may be configured as a slanted portion 520-1, which is slanted such that the distance from the first support portion 510 thereto increases from the distal end thereof to the portion thereof that is coupled to the electromagnetic-field shield 300.

The slanted portions 520-1 of the coupling bosses 500, which are spaced apart from each other in the optical axis direction of the lens unit 10, may be arranged in a zigzag manner in the optical axis direction. The purpose of these slanted portions 520-1 is to facilitate the coupling of the boards 200 to the coupling bosses 500, which will be described in detail later with reference to FIGS. 9a to 9d.

The connectors 60, as described above, serve to electrically connect the boards 200 to one another. Therefore, the number of connectors 60 may be one less than the number of boards 200.

Meanwhile, the electromagnetic-field shield 300 may be coupled to the first board 200-1, which is provided at one end thereof with the image sensor 600, and to the housing 50. To this end, the electromagnetic-field shield 300 may be provided with board-coupling portions 330, which may be extended so as to be bent from one end of the electromagnetic-field shield 300.

The board-coupling portions 330, as illustrated in FIG. 5, may come into contact at the top surfaces thereof with the bottom surface of the housing 50 and may come into contact at the bottom surfaces thereof with the top surface of the first board 200-1 based on the drawing, may be coupled to the first board 200-1 by means of fasteners 700, and may also be coupled to the housing 50 by means of the fasteners 700.

To this end, the fasteners 700 may penetrate through the board-coupling portions 330 and the first board 200-1 and may then be fastened to the housing 50. At this time, for example, screws, bolts, coupling pins, or a coupling adhesive may be used for the fasteners 700.

Therefore, the electromagnetic-field shield 300 may be coupled to the housing 50 in a manner such that the board-coupling portions 330 are coupled to the housing 50 by means of the fasteners 700. As a result, the electromagnetic-field shield 300 may be securely coupled to the housing 50 and the respective boards 200 may be coupled to the electromagnetic-field shield 300, thereby maintaining the firm coupling state of the respective boards 200.

Figure 7A:
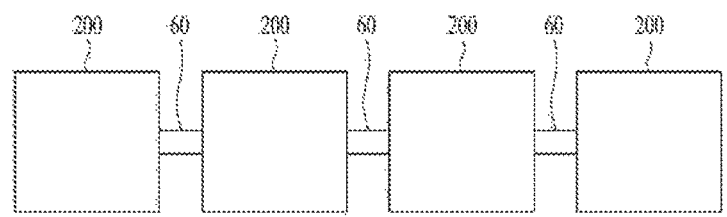
FIGS. 7a to 7c are schematic views illustrating exemplary connecting structures of boards and connectors according to the embodiment.
Figure 7B:
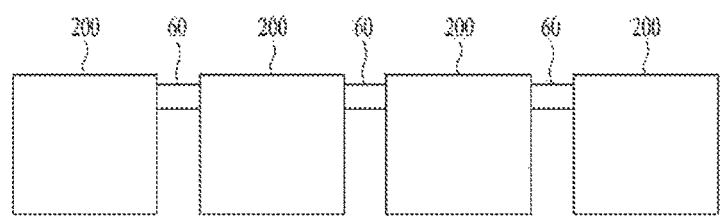
Figure 7C:
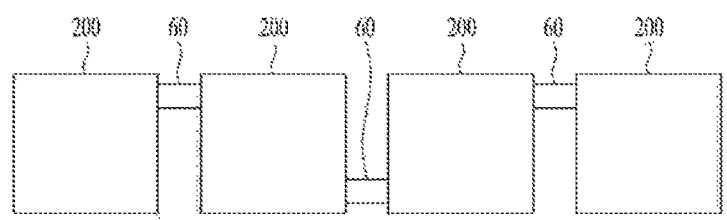

FIGS. 7a to 7c are schematic views illustrating exemplary connecting structures of the boards 200 and the connectors 60 according to the embodiment.

The number of connectors 60 connected to the respective boards 200, as described above, may be one less than the number of boards 200. The connectors 60 may serve to electrically connect the boards 200 to one another such that the connectors 60 are coupled to middle regions of the lateral sides of the boards 200, as illustrated in FIG. 7a.

Further, the connectors 60 may serve to electrically connect the boards 200 to one another such that the connectors 60 are coupled to marginal regions of the lateral sides of the boards 200, as illustrated in FIG. 7b. Furthermore, the connectors 60 serve to electrically connect the boards 200 to one another such that the connectors 60 are coupled to marginal regions of the lateral sides of the boards 200, as illustrated in FIG. 7b; specifically, the connectors 60 coupled to each of the boards 200 may be arranged in a zigzag manner.

Selection from among the above-described methods of connecting the connectors 60 to the boards 200 may be appropriately made in consideration of the detailed shape of the boards 200 and the positions of the elements provided at the boards 200. Further, if necessary, the above-described three connection methods of the connectors 60 may be used in a mixed way.

Figure 8:
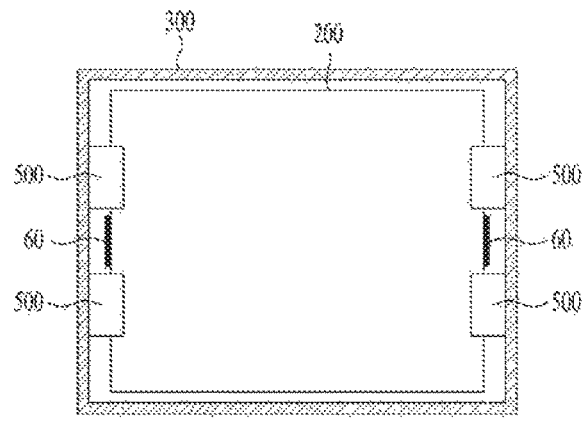
FIG. 8 is a cross-sectional view illustrating the interior configuration of the camera module according to the embodiment.

FIG. 8 is a cross-sectional view illustrating the interior configuration of the camera module according to the embodiment.

At least a portion of each of the coupling bosses 500 that are arranged in the direction perpendicular to the optical axis direction of the lens unit 10 may be located at a region that does not overlap the arrangement position of each of the connectors 60. As the lateral sides of the respective boards 200, which are coupled to the coupling bosses 500, do not overlap the arrangement positions of the connectors 60, the connectors 60 may be prevented from being caught in and damaged by the coupling bosses 500 when the boards 200 are coupled to the coupling bosses 500.

As illustrated in FIG. 8, for example, when the connectors 60 are coupled to the middle regions of the lateral sides of the boards 200, a plurality of coupling bosses 500 may be provided in the direction perpendicular to the optical axis direction of the lens unit 10 and may be located at appropriate positions such that each of the coupling bosses 500 is coupled to the marginal region of the lateral side of each of the boards 200.

Although FIG. 8 illustrates that the connectors 60 are coupled to the middle regions of the lateral sides of the respective boards 200, the coupling bosses 500 may be arranged so as not to overlap the arrangement positions of the connectors 60 even when the connectors 60 are coupled to the marginal regions of the lateral sides of the respective boards 200 or are coupled to the marginal regions in a zigzag manner, or even when the three connection methods are used in a mixed way as described above.

FIGS. 9a to 9d are views illustrating an exemplary process of assembling the boards 200 and the electromagnetic-field shield 300 with the camera module.

Figure 9A:
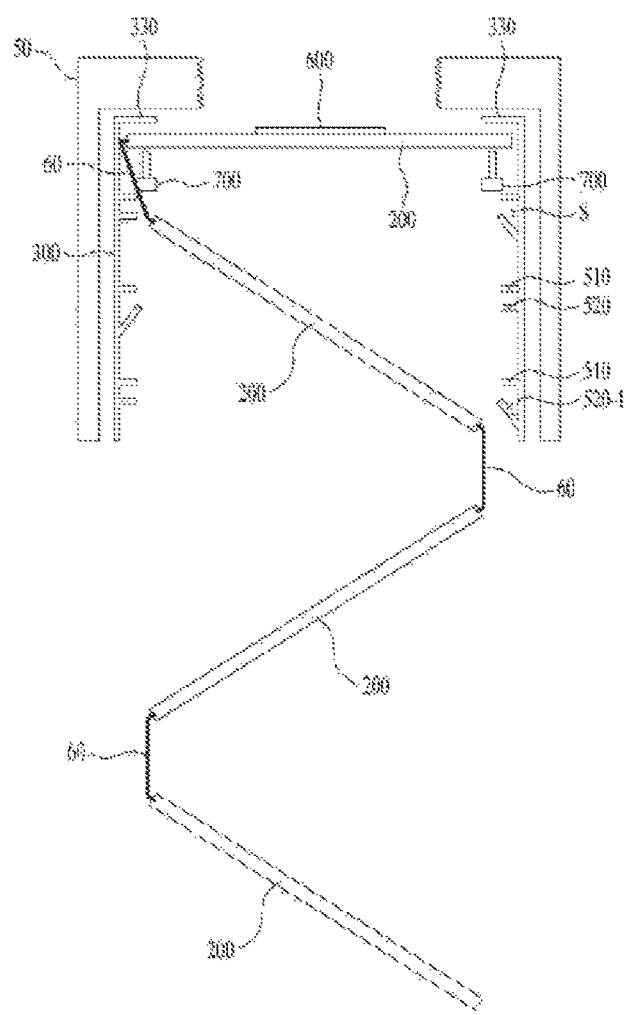
FIGS. 9a to 9d are views illustrating an exemplary process of assembling the boards and the electromagnetic-field shield with the camera module.

An exemplary assembly process is as follows. First, the boards 200 and the connectors 60 are coupled to each other. Subsequently, as illustrated in FIG. 9a, the first board 200-1 and the board-coupling portions 330 are coupled to the housing 50 using the fasteners 700.

Figure 9B:
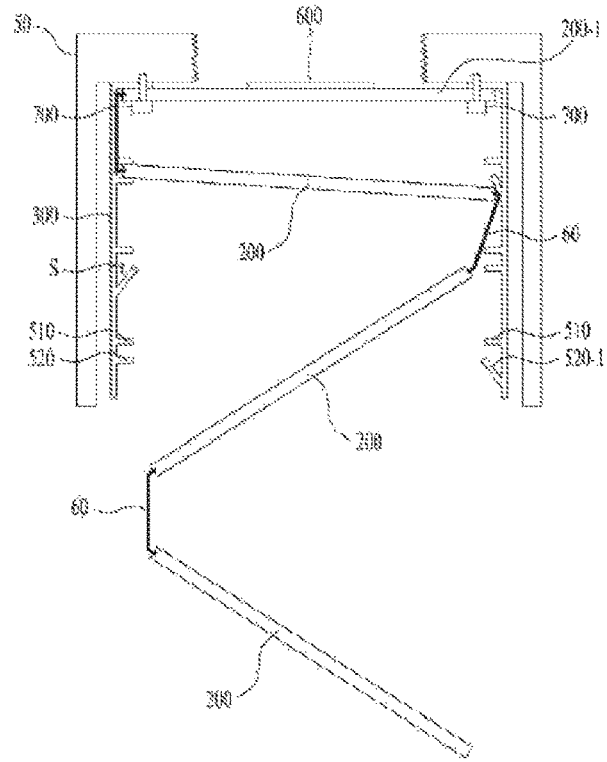

Subsequently, as illustrated in FIG. 9b, one lateral side of the second board 200, which is located adjacent to the first board 200-1, is coupled to the coupling boss 500 located at the left in the drawing, and the opposite lateral side thereof is brought into contact with the slanted portion 520-1 located at the right in the drawing so as to press the slanted portion 520-1.

As the opposite lateral side of the board 200 presses the slanted portion 520-1, the slanted portion 520-1 is slightly bent to allow the opposite lateral side of the board 200 to be inserted into the insertion space s. When the opposite lateral side of the board 200 is completely inserted into the insertion space s, the slanted portion 520-1 returns to the original position thereof due to its elasticity and the opposite lateral side of the board 200 is securely coupled to the coupling boss 500 including the slanted portion 520-1.

Figure 9C:
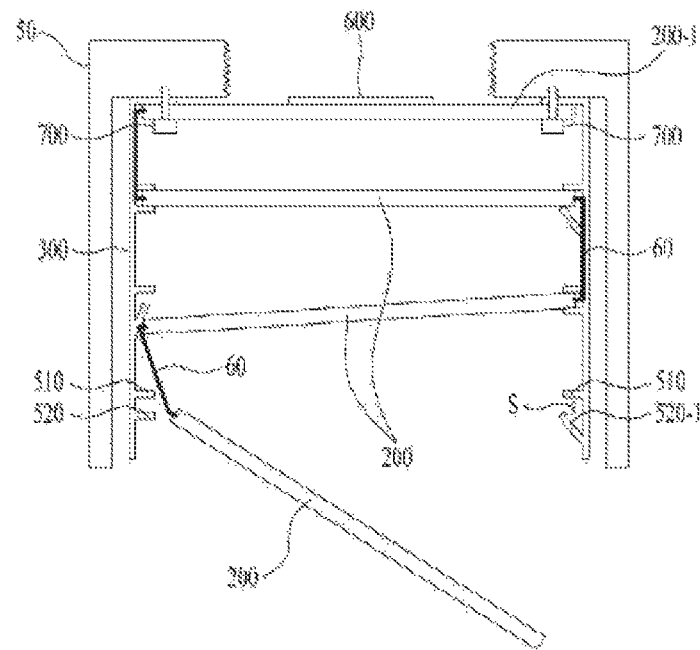

Subsequently, as illustrated in FIG. 9c, the third board 200 is coupled to the coupling boss 500 in the same way as described above with reference to FIG. 9b. At this time, the coupling method illustrated in FIG. 9c is basically the same as that in FIG. 9b except that the coupling of the third board 200 is performed symmetrically to the above-described coupling of the board 200 that is located adjacent to the first board 200-1.

Figure 9D:
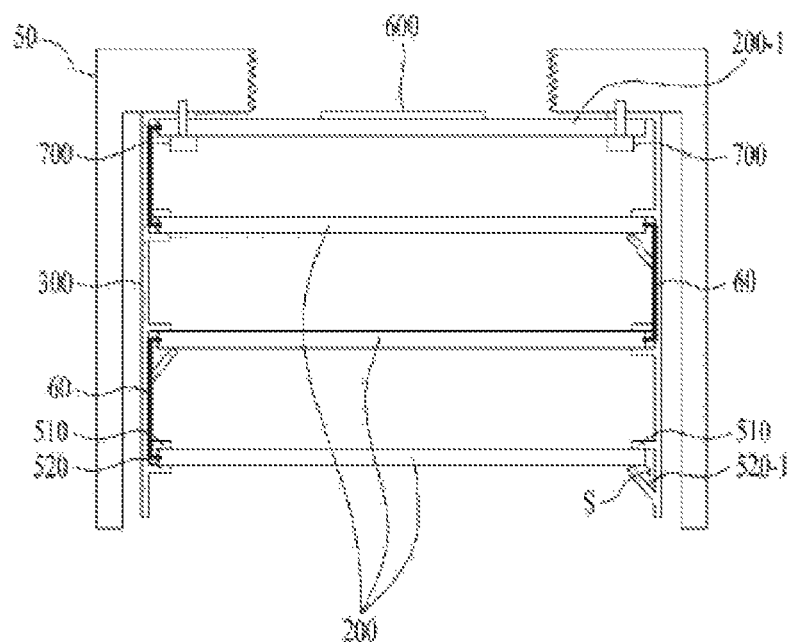

Subsequently, as illustrated in FIG. 9d, the fourth board 200 is coupled to the coupling boss 500 in the same way as described above with reference to FIG. 9b, thereby completing the process of coupling the boards 200 to the electromagnetic-field shield 300.

Although the embodiment illustrates that four boards 200 are connected to one another via three connectors 60, the above-described coupling method may also be identically applied to the case in which two, three, or five or more boards 200 are coupled to the electromagnetic-field shield 300.

According to the embodiments, the coupling bosses 500 having a simple structure are formed at the electromagnetic-field shield 300, which has the effect of enabling the boards 200 to be securely coupled to the interior of the camera module while being spaced apart from each other by a given distance.

In addition, owing to the firm coupling structure of the respective boards 200, the respective boards 200 maintain a constant distance therebetween, rather than deviating from given positions, even if external shocks or vibrations are continuously applied thereto, which has the effect of preventing damage to the boards 200 and the malfunction of the camera module.

In addition, it is possible to variously set the distance between the respective coupling bosses 500 in the optical axis direction, which has the effect of enabling easy adjustment of the distance between the respective boards 200.

In addition, through the easy adjustment of the distance between the respective boards 200, it is possible to provide the connectors 60 for electrical connection between the respective boards 200 with an assembly tolerance to prevent the connectors 60 from being tightly coupled to the respective boards 200, which has the effect of preventing damage to the connectors 60 and short-circuit due to shocks or vibrations.

Although only several embodiments have been described above, various other embodiments are possible. The technical contents of the above-described embodiments may be combined into various forms as long as they are not incompatible with one another, and thus, may be implemented in new embodiments.

INDUSTRIAL APPLICABILITY

According to the embodiments, respective boards are securely coupled to the interior of a camera module while maintaining a constant distance therebetween through coupling bosses having a simple structure and formed at an electromagnetic-field shield, and accordingly, the camera module has industrial applicability.

The invention claimed is:
1. A camera module comprising:
a lens unit;
a housing coupled with the lens unit;
a plurality of boards located inside the housing while being spaced apart from each other; and
an electromagnetic-field shield located inside the housing in order to prevent outward leakage of an electromagnetic field formed in each of the boards,
wherein the electromagnetic-field shield is provided with a coupling member to enable the boards to be coupled to the electromagnetic-field shield while being spaced apart from each other in an optical axis direction of the lens unit,
wherein the plurality of boards are electrically connected to a ground wire, and the ground wire is one of a plurality of cables electrically connected to the plurality of boards, and
wherein the coupling member includes coupling bosses, each having one end protruding from an inner surface of the electromagnetic-field shield.

2. The camera module according to claim 1, wherein each of the coupling bosses includes a first support portion, formed at a region that is relatively close to the lens unit, and a second support portion, formed at a region that is relatively far from the lens unit as compared to the first support portion, the first support portion and the second support portion being spaced apart from each other and forming an insertion space therebetween into which a lateral side of each of the boards is inserted.

3. The camera module according to claim 2, wherein the coupling bosses include a pair of coupling bosses formed on the inner surface of the electromagnetic-field shield so as to face each other.

4. The camera module according to claim 2, wherein at least a portion of the second support portion is configured as a slanted portion that is slanted such that a distance from the first support portion thereto increases from a distal end thereof to a portion thereof that is coupled to the electromagnetic-field shield.

5. The camera module according to claim 4, wherein the coupling bosses are spaced apart from each other by a constant distance in the optical axis direction of the lens unit such that the slanted portion of each of the coupling bosses and the slanted portion of another one of the coupling bosses adjacent thereto are arranged in a zigzag manner in the optical axis direction.

6. The camera module according to claim 2, further comprising:
connectors that electrically connect the boards to one another.

7. The camera module according to claim 2, wherein the coupling bosses are arranged in a direction perpendicular to the optical axis direction of the lens unit.

8. The camera module according to claim 6, wherein at least a portion of each of the coupling bosses arranged in the direction perpendicular to the optical axis direction of the lens unit is located at a region that avoids overlap with an arrangement position of each of the connectors.

9. The camera module according to claim 1, wherein the boards include a first board located adjacent to the lens unit, the first board being provided with an image sensor for capturing an image of an object transmitted from the lens unit.

10. The camera module according to claim 9, wherein the first board provided with the image sensor is coupled to one end of the electromagnetic-field shield.

11. The camera module according to claim 10, wherein the electromagnetic-field shield is provided with board-coupling portions that are extended so as to be bent from the one end of the electromagnetic-field shield, and the board-coupling portions and the first board are coupled to each other by means of fasteners.

12. The camera module according to claim 11, wherein the fasteners penetrate through the board-coupling portions and the first board and are fastened to the housing.

13. The camera module according to claim 11, wherein the fasteners include at least one selected from among screws, bolts, coupling pins, and a coupling adhesive.

14. The camera module according to claim 11, wherein the electromagnetic-field shield is coupled to the housing in a manner such that the board-coupling portions are coupled to the housing by means of the fasteners.

15. A camera module comprising:
a housing;
a plurality of boards located inside the housing while being spaced apart from each other;
an electromagnetic-field shield located inside the housing;
coupling bosses located inside the electromagnetic-field shield to enable the boards to be coupled to the electromagnetic-field shield while being spaced apart from each other; and
a plurality of connectors that electrically connect the boards to one another,
wherein the plurality of boards are electrically connected to a ground wire, and the ground wire is one of a plurality of cables electrically connected to the plurality of boards, and
wherein the boards outnumber the connectors by one.

16. The camera module according to claim 15, wherein the connectors are configured as flexible circuit boards, and at least a portion of each of the coupling bosses is formed in a shape for avoiding overlap with the connectors when the flexible circuit boards are coupled thereto.

17. The camera module according to claim 15, further comprising:
a lens unit coupled to the housing; and
an image sensor provided at one of the boards that is located adjacent to the lens unit in order to capture an image of an object transmitted from the lens unit.

18. The camera module according to claim 15, wherein the connectors are coupled to marginal regions of lateral sides of the boards, the connectors coupled to each of the boards being arranged in a zigzag manner.

* * * * *